United States Patent
Sammarco et al.

[15] 3,648,538
[45] Mar. 14, 1972

[54] CONTROL MECHANISM

[72] Inventors: Peter Sammarco, Bellwood; Arnold Zimmerman, Downers Grove, both of Ill.

[73] Assignee: International Harvester Company, Chicago, Ill.

[22] Filed: July 6, 1970

[21] Appl. No.: 52,156

[52] U.S. Cl. ................................74/491, 74/150, 74/155
[51] Int. Cl. ................................................G05g 7/00
[58] Field of Search..................74/491, 490, 150, 155, 154

[56] References Cited

UNITED STATES PATENTS

| | | | |
|---|---|---|---|
| 1,102,434 | 7/1914 | Phelps | 74/150 X |
| 2,187,665 | 1/1940 | Scates | 74/491 X |

*Primary Examiner*—Milton Kaufman
*Attorney*—Floyd B. Harman

[57] ABSTRACT

A control apparatus having a primary control element selectively movable through a predetermined sequence of indexed positions whereat it may act upon a device to effect a control of the same, the control apparatus being selectively positionable to previously indexed positions directly from an advanced position without the need of reinitiating the sequence.

11 Claims, 7 Drawing Figures

INVENTORS
PETER SAMMARCO
ARNOLD D. ZIMMERMAN

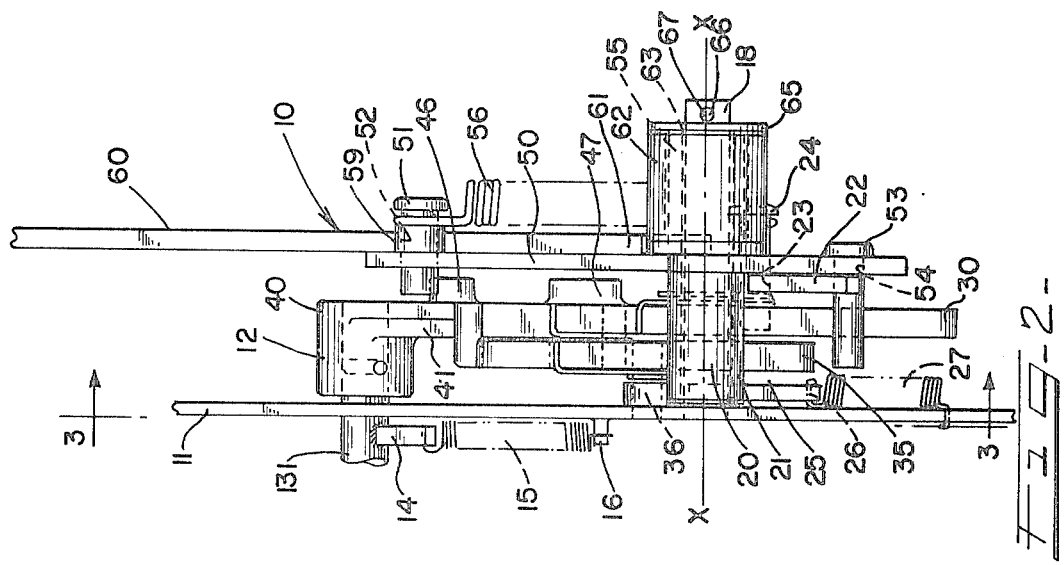
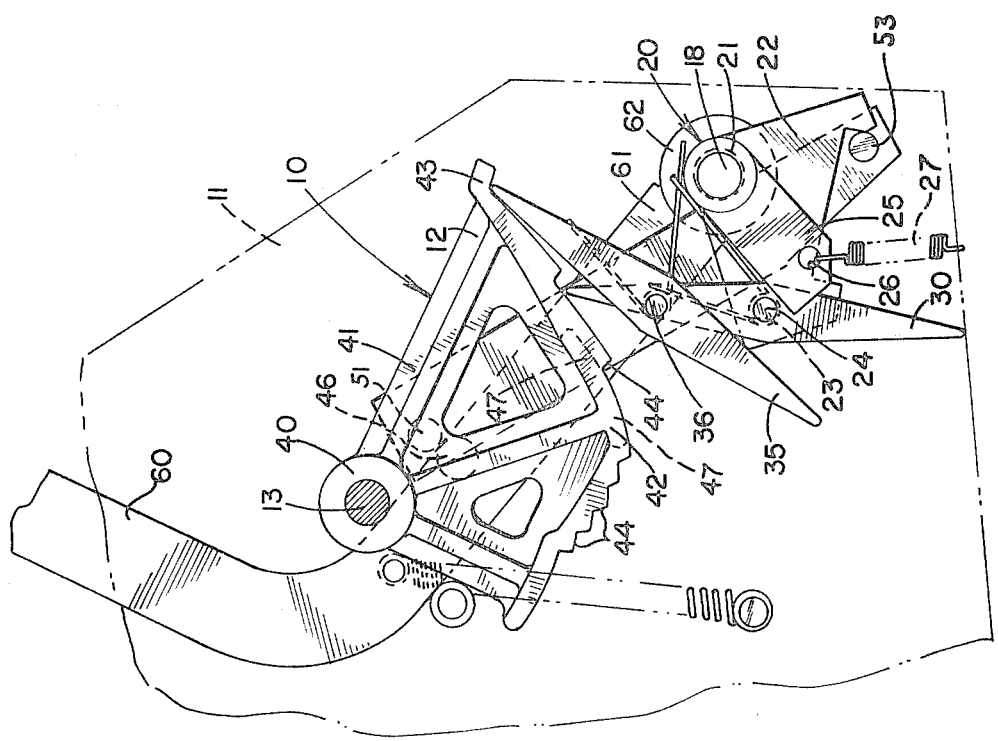

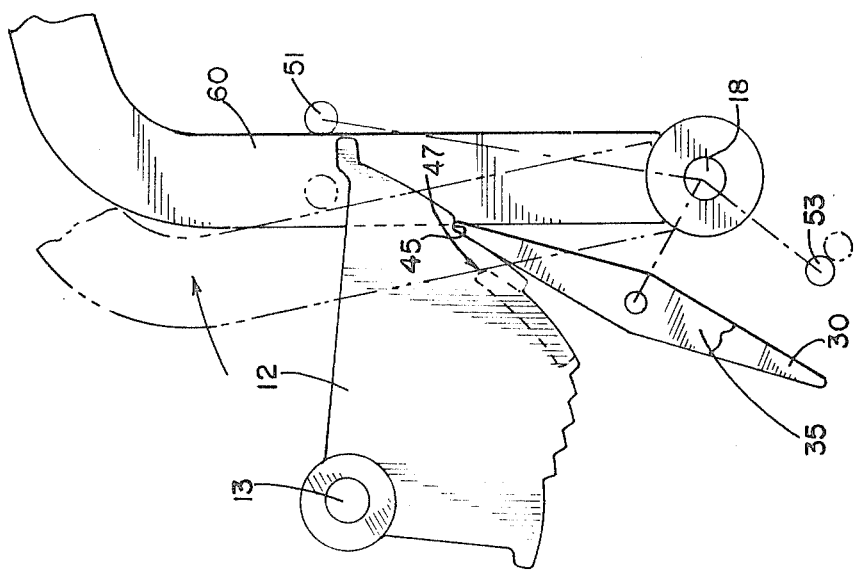
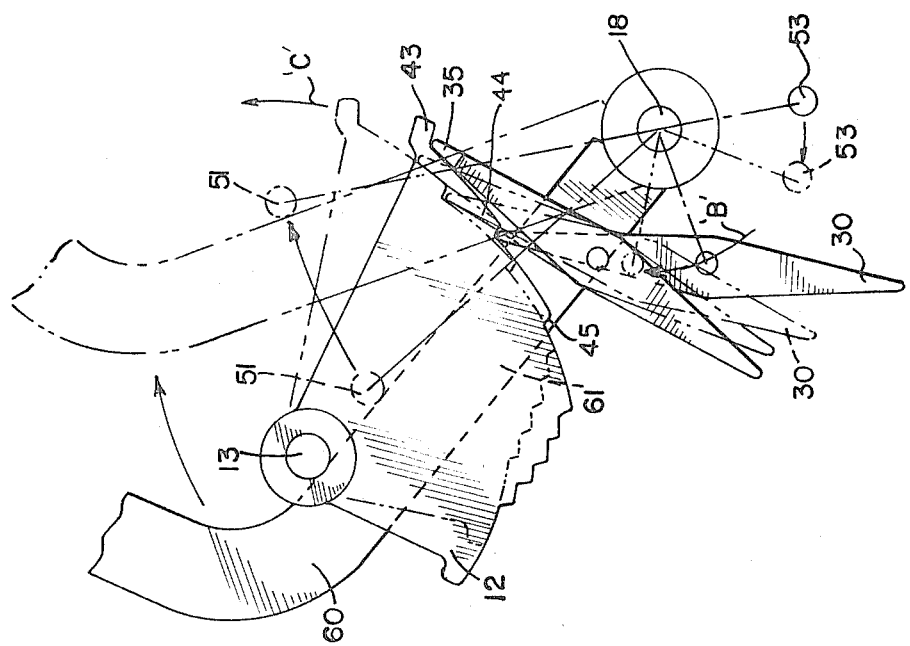
INVENTORS
PETER SAMMARCO
ARNOLD D. ZIMMERMAN

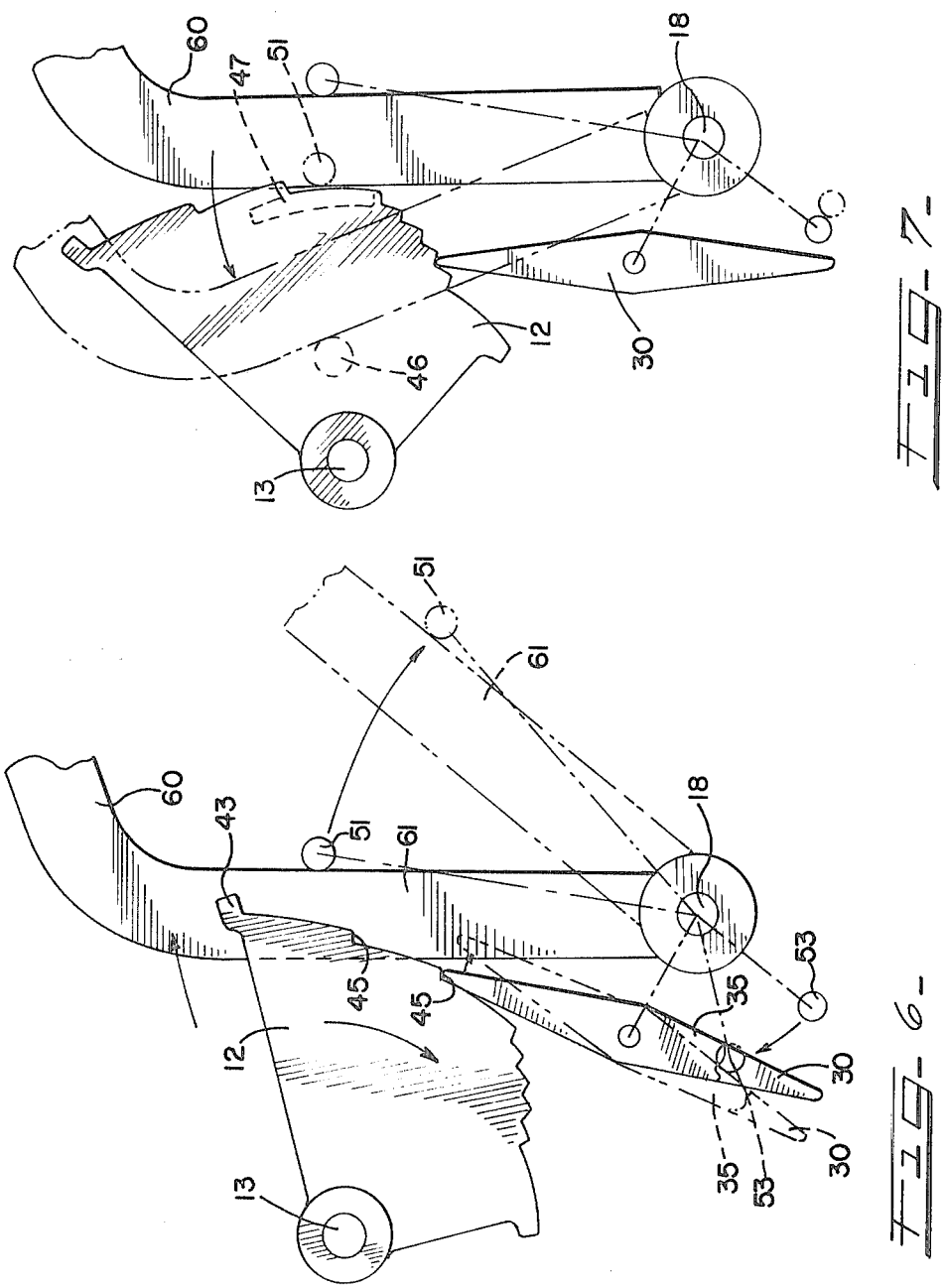

CONTROL MECHANISM

BACKGROUND OF THE INVENTION

The instant invention relates to a control apparatus adapted for, but certainly not limited to, use on trailing vehicles such as forage wagons, manure spreaders and the like which characteristically have a plurality of functions. Such vehicles may have in combination, driven: material beds, beaters, unloading and distributing augers, material distributing mechanisms and unloaders which may when used in combination necessitate initiating the operation thereof in a predetermined sequence or cycle to prevent damage to the machinery.

The mechanism to which the instant invention relates commonly incorporates a toothed control segment which is intermittently driven in an annular movement to selected positions which correspond to angular displacements of an associated element such as a shaft. The element is operatively connected to drive mechanisms, control and/or actuated machine functions. The drive mechanisms respond to those specific angular displacements in such a manner that the selected positions of the toothed segment relate to various actuations and combinations of machine functions. It is also contemplated that the invention have a control arm operable to initiate the annular movement of the segment through a predetermined cycle in order that machine functions can be selectively initiated, regulated and/or arrested in a particular sequence.

In view of the foregoing, one of the features of the invention is that through manipulation of the control handle the control segment can be indexed to a prior position in the cycle to thereby reselect a particular mode of machine function without the need of completing the cycle or reinitiating the cycle from the beginning to reestablish that particular mode of machine function. Another related feature of the invention is to enable that the control segment be indexed back to the initial position directly from any position in the cycle without the need of indexing through prior positions or completing the cycle. It is comprehended that the control arm have a travel by which the control segment is caused to be indexed to the various positions within the cycle and that the amount of travel for operations is limited in relation to the angular displacement between the teeth on the segment.

Another object of the invention is to provide for the handle being operated from a location remote from the control mechanism itself, for instance from an associated tractor by means of a rope or flexible cable.

Other objects and features of the invention will become apparent as the description proceeds, especially when taken in conjunction with the accompanying drawings illustrating a preferred embodiment of the invention.

BRIEF DESCRIPTION OF THE DRAWINGS

FIG. 2 is an end view of the apparatus at line 2—2 of FIG. 1;

FIG. 3 is a side elevational view of the control apparatus taken substantially at line 3—3 of FIG. 2;

FIG. 4 is a side elevational and partial view of an apparatus showing the mechanism thereof being indexed from a neutral through a partial indexing stroke;

FIG. 5 is the view of FIG. 4 showing the mechanism at the end of the indexing stroke;

FIG. 6 is the view of FIG. 4 showing the mechanism being released from an indexed position; and FIG. 7 is a view of FIG. 4 showing the mechanism returning to a neutral indexed position.

DESCRIPTION OF THE PREFERRED EMBODIMENT

Figure 1:
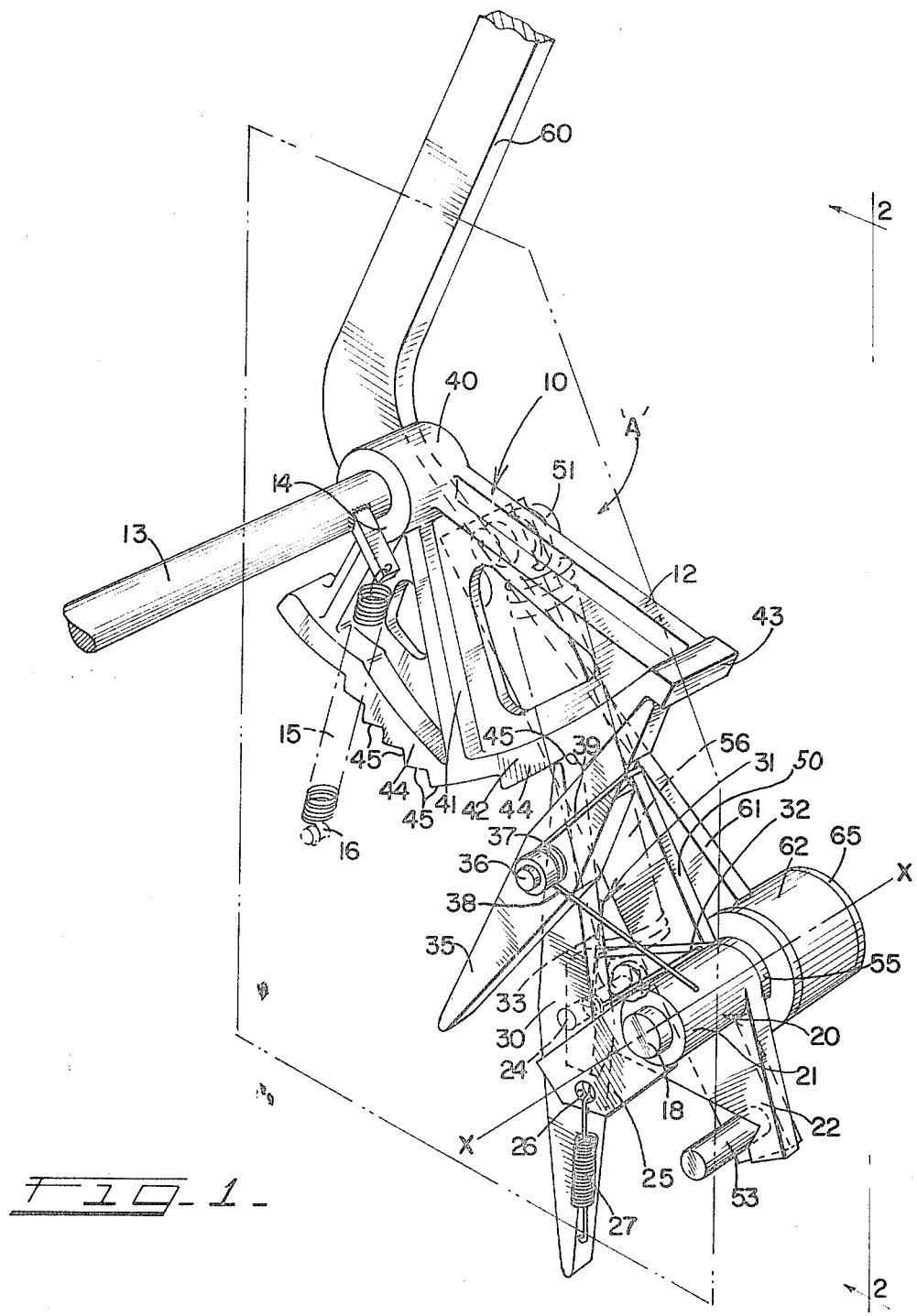
FIG. 1 is a perspective view of the control apparatus showing the supporting wall and obscured portions of the mechanism in hidden lines.

Turning attention to FIGS. 1, 2 and 3, the instant invention, namely a control apparatus generally designated 10 is shown in an initial operating position. It should be pointed out at this time that certain components of the control apparatus 10 are supported on a frame in the form of a wall, designated 11 and shown in FIG. 2, this wall structure for the sake of clarity has been depicted as a transparent plane in FIGS. 1 and 3 for the reason that the working relationships of the components are more easily understood when viewed from the side of the wall structure 11.

The control apparatus includes a control segment 12 mounted on a shaft 13 which is journaled on the wall 11. The segment 12 is secured to the shaft 13 such that the segment and shaft are constrained to rotate about the principal axis of the shaft. An arm 14 is affixedly mounted radially from the shaft 13. A spring 15 connects between free end of the arm 14 and a pin 16 extending outwardly from the wall 11 as seen in FIG. 2, to bias the segment 12 for rotation in the direction as indicated by the arrow designated 'A.'

A stub shaft 18 having an end thereof affixedly mounted on the wall 11 extends therefrom in substantial parallelism to the shaft 11. It can be seen that the stub shaft 18 is disposed in sufficient spaced relation from the control segment 12 in order that other components of the apparatus can be effectively arranged therebetween.

As best seen in FIGS. 1 and 2 a pushing pawl arm assembly, generally designated 20 comprises a cylindrical body 21 which slides over and rotatably mounts on the stub shaft 18 at a position adjacent the wall 11. A pushing pawl support arm 22 is affixedly mounted in radial extension at one end of the body 21. The support arm 22 has a hole 23 in which a headed pin 24 has been press fitted. It can be seen that the pin 24 extends on each side of the arm 22. A stop arm 25 disposed on the other end of the body 21, has a hole 26 therethrough which receives one end of a tension spring 27. It should be noted that (as best seen in FIG. 3) the stop arm 25 angularly lags the pin 24 mounted in the pushing pawl support arm 22. The angular lag is slight but necessary as will be explained hereinafter. The other end of the spring 27 is connected to the wall to thereby provide a counterclockwise moment (as viewed in FIG. 1) on the pushing pawl arm assembly.

A pushing pawl 30 is rotatably mounted intermediate its ends on the pin 24 between the support and stop arm (22, 25) and in alignment with the control segment 12. The pushing pawl is slightly spaced from the support arm 22 so that a wire spring 31 can be loosely mounted on the pin 24 where one leg 32 rests against the body 21 and the other leg 33 of the spring engages the pushing pawl 30 as shown in FIG. 2 thus biasing the pushing pawl about the pin 24 and into engagement with the control segment 12.

A holding pawl 35 is rotatably supported on a pin 36 in juxtaposition to the pushing pawl 30 and in alignment with the control segment 12. The supporting pin 36 is affixedly secured to the wall 11 and includes a shoulder portion which serves to space the holding pawl from the wall 11. A wire spring 37 is loosely mounted in a space between the shoulder portion and the holding pawl and has one leg 38 which rests on the body 21 of the pushing pawl arm assembly 20. The other leg 39 of the spring 37 engages the holding pawl such that the pawl is bias about its supporting pin 36 toward the control segment 12.

The control segment in the form of a sector 12 comprises a hub 40 which receives and is secured to the shaft 13. Extending radially outward from the hub is a web-like structure 41 terminating in an arcuate rack 42 having a volute stepped surface against which the pawls 30 and 35 are biased. A stop lug 43 extends radially outward from one end of the rack 42 to thereby provide a limit and an initiating position for the control apparatus. The rack has a plurality of steps or serrations 44 defining a circumferential surface 45 each of which is angularly displaced along the extent of the rack. Protruding from one side of the web-like structure is a circular and an arcuate protrusion designated 46 and 47 respectively. The specific function of these protrusions will be described hereinafter.

An operating arm 50 comprises a flat bar with a headed stop pin 51 and a kick out pin 53, each press fitted into respective holes 52 and 54 respectively which are disposed in diametrical end portions of the bar. The stop pin 51 extends partially through the bar having each end thereof protruding from the bar. A collar 59 has been loosely fitted over the other part of the pin 51 between the arm 50 and head thereof producing a groove therebetween. The kick out or pawl-displacing pin 53 on the other hand is fully pressed into its hole 54.

The arm 50 has a semicircular notch disposed intermediate the pins 51 and 53. A cylindrical hub 55 is fitted on one end thereof into the notch and welded to the arm at that position. The hub 55 has an internal bore having an internal diameter slightly larger than the diameter of the shaft 18 to assure rotatability when disposed thereon. The hub 55 of the arm 50 is arranged on the shaft 18 such that the arm 50 is positioned adjacent the pushing pawl assembly 20. A spring 56 is then connected between the pushing pawl pivot pin 24 of the pushing pawl assembly 20 and the headed stop pin 51 of the operating arm 50, thereby providing a resilient and yieldable linkage between those particular locations on operating arm and pawl assembly. It should be noted that the spring 51 has been connected to the outer ends of the pins 24 and 51 leaving a clearance between the spring 56 and the operating arm 50.

An actuating handle 60 has a flat straight segment 61 which has a semicircular notch formed in the end thereof. A cylindrical hub 62 is affixedly secured to the segment 61 at that notch as best seen in FIG. 3. The hub 62 has an internal bore 63 having an internal diameter slightly larger than the external diameter of the hub 55 of the operating arm 50. The hub 62 of the handle is also slightly shorter in axial length than that of the hub 55 of the operating arm. The hub 62 is then placed over the hub 55 of the operating arm for rotation thereon with the segment 61 of the handle 60 disposed adjacent the operating arm 50 and in the clearance between the spring 56 and the operating arm. It can be seen that the handle 60 is oriented in relation to the operating arm so that the straight segment 61 of the handle will engage the collar 59 on the pin 51 secured to the end of the operating arm 50. The axial length of the hub 62 of the handle is slightly shorter than that of the hub 55 of the operating arm 50 in order that when pushing pawl assembly 20, the operating arm 50, and the handle 60 are assembled on the shaft 18 the outer ends of the hubs 55 and 62 will be in approximated alignment. When this stage of assembly is reached a washer 65 having an outer diameter about that of the hub 62 is placed on the shaft 18 as shown and a pin 66 such as a cotter pin, is fastened in place through a hole 67 in the free end portion of the stub shaft 18.

It can be seen that the pushing pawl assembly 20, the operating arm 50, and the handle are not only rotatably secured on the stub shaft 18 but are also concentrically disposed with respect to that shaft whereby each of them is constrained to rotate about the principal axis, designated X—X, of the shaft 18.

The instant invention is effective for providing a sequence of predetermined angular displacements of the output shaft 13 which correspond to the disposition of the surfaces 45 of the steps 44 along the rack 42 of the segment 12. The output shaft 13 may be connected to other drive mechanisms, such as transmissions or clutches, (not shown) which have actuating devices correlated to particular angular displacements of the output shaft 13. One of the novel operating characteristics of the instant invention is the ability to index directly back to prior displacements without the need of reinitiating the indexing cycle.

Some of the operating characteristics are illustrated in FIGS. 4 through 7, where the full lines represent components of the control mechanism at a particular position of actuation, and the phantom lines represent other positions of those same components during operation. These FIGS. (4–7) will be used to explain the operation of the control mechanism and it will be helpful to refer to the perspective illustration of FIG. 1 as to the physical disposition and relation of the various components.

Referring to FIG. 4, there is shown the segment 12, handle 60, pushing and holding pawls 30 and 35 respectively. It can be seen that in the initial position (full lines) the holding pawl 35 is resting against the stop lug 43 and the pushing pawl 35 is disposed against the face 45 of the first step 44. As the handle 60 is moved from the solid line position to a partial indexed position shown in phantom, the straight segment 61 of the handle engages the pin 51 (at the collar 59) secured to the operating arm 50 and thereby causes the arm 50 to rotate about the axis X—X of the shaft 18. When this occurs the resilient linkage represented by the spring 56 connected between the pin 51 of the operating arm 50 the pushing pawl pin 24 secured to support arm 22 of the pushing pawl arm assembly 20, acts to provide a force on that arm assembly causing it to rotate in the direction of arrow designated 'B.' This forces the pushing pawl 30 against the face 45 causing the segment 12 to rotate about the principal axis of the output shaft 13 in the direction indicated by an arrow designated 'C.' It can be seen that as the segment 12 rotates the engageable end of the stationary holding pawl 35 approaches the face 44 which is engaged by the pushing pawl 30. It should also be noted that during the entire partial indexing hereinbefore described the kick out pin 53 on the operating arm 50 maintains a substantially constant distance relative to the pawls 30 and 35.

FIG. 5 shows the handle 60 at the partially indexed position of FIG. 5 (phantom lines) and moved to a position (full lines) where the pushing pawl 30 has advanced the segment 12 such that the holding pawl 35 has been indexed into engagement with the face 45. It can be seen that when this occurs both pawls are in a substantially aligned juxtaposed position wherein the point about which the pushing pawl pivots (i.e., the pin 24) is approximately coincidental with the point about which the holding pawl pivots. Actually the pushing pawl must advance slightly beyond a position of coincidence with the holding pawl 35 so that the segment 12 is advanced sufficiently to allow the holding pawl to index into engagement with the face 45. When the pawls are in the position just indicated the stop arm 25 of the arm assembly 20 has rotated about the axis X—X and into engagement with the shoulder of the holding pawl supporting pin 36, thereby preventing further rotational movement of the arm assembly 20 in that direction. It should be observed that the kick out pin 53 on the supporting arm 22 is still about the same distance from the pawls as before (see FIG. 4).

The action of the control mechanism when the handle is still further advanced is depicted in FIG. 6 at which the point of pivot of each pawl (30, 35) were in a position approximately coincidental. At this point the pushing pawl supporting arm assembly 20 is prevented from rotating as hereinbefore described, but the handle 60 still continues to pivot the operating arm 50 about the axis X—X. It can be seen that since the supporting arm assembly 20 and operating arm 50 no longer rotate together, the kick out pin 53 on the arm 50 advances toward the pawls 30, 35 until engagement therewith occurs. At this time the pawls are pivoted outwardly from engagement with the control segment 12 such that the segment can rotate directly back to a previously indexed position because of the volute shape of the control segment. If the handle is continued to be advanced the kick out pin 53 will pivot the pawls sufficiently to release the control segment 12 again wherein it will index back to the initial position whereat the holding pawl 35 engages the stop lug 43.

When the handle is released from an advanced position the operating arm 50 follows the handle and the pushing pawl arm assembly 20 is rotated back toward its initial position depicted in FIG. 5 by action of the spring 27 acting on the stop arm 25 as the linkage spring 56 releases the support arm 22.

The circular and arcuate protrusions 46 and 47 disposed on web portion 41 of the control segment 12 are arranged at positions which will engage the pin 51 on the operating arm 50 as that arm returns to a position at which the pushing pawl 30 will index to the next face 45 which is next to be engaged and advanced. The disposition and shape of these protrusions must be chosen so that the arm will only return to that preceding position to permit the pushing pawl arm assembly 20 to reposition the pushing pawl 30 only at the preceding face 40 of the face that was just indexed. Therefore the shape and position of these protrusions (46,47) are dependent on the number and angular displacements of the steps on the face of the control segment. FIG. 7 shows the handle 60 being returned to an initial position, but the pin 51 on the operating arm 50 engaging the arcuate protrusion 47 to thereby prevent the pushing pawl from being repositioned more than one preceding face at an advanced stage of indexing of the control segment. FIG. 3 shows the circular protrusion 46 in contact with the pin 51 for the same purpose at a primary stage of indexing. Since the steps shown on the control segment are merely for purposes of illustration in the embodiment described it is apparent that modification in the number of steps and the relative angular displacement of their respective pawl engaging faces will require corresponding modification in protrusions of the type indicated at 46 and 47.

It will be appreciated that the embodiment of the invention chosen for the purposes of illustration and description herein is that preferred based upon requirements for achieving the objects of the invention and developing the utility thereof in the most desirable manner, due regard being had to existing factors of economy, simplicity of design and construction, production methods and the improvements sought to be effected. It will be understood, that the particular structure and functional aspect emphasized herein are not intended to exclude but rather to suggest such other modifications and adaptations as fall within the spirit and scope of the invention.

What is claimed is:

1. A control mechanism operative for indexing a control shaft through a sequence of selected positions, comprising:
   a frame;
   a control segment connected with the shaft for incremental movements to effect an indexing of said shaft, said segment having a plurality of engageable surfaces each of which correlate to a particular selected position of said shaft;
   a holding pawl singularly engaging said surfaces to retain the segment in said selected positions;
   a pushing pawl having a direction of travel effective to engage said surfaces;
   biasing means providing a force for urging said segment to move in a direction generally opposite that of said pushing pawl and tending to self-return to an initial position;
   pawl-displacing means having a range of movement effective for moving said pushing pawl into engagement with one of said surfaces to sequentially effect the incremental movement of said control segment to index the same to one of various selected positions whereat the holding pawl engages said one surface and retains the segment against the force of said biasing means; and
   said pawl-displacing means including means for simultaneously releasing both said pushing and holding pawls from engagement with said segment, said releasing means operatively engaging said pawls during continued movement of said pawl-displacing means beyond said range after indexing occurs wherein the segment is released for movement back to former positions.

2. The invention as recited in claim 1 wherein said segment comprises a sector mounted on said control shaft to rotatably drive the same, the peripheral portion of said sector defining an arcuate rack on which said radial surfaces are disposed.

3. The invention as recited in claim 2 wherein said holding pawl member has an elongated shape and is pivotally mounted intermediate its ends on said frame, and spring means biasing one end of said holding pawl into engagement with said arcuate rack.

4. A control mechanism operative for indexing a control shaft through a sequence of selected positions, comprising:
   a frame;
   a control segment mounted for incremental movements on said frame wherein said movements effect an indexing of said shaft, said segment having a plurality of engageable surfaces each of which correlate to a particular selected position of said shaft;
   a holding pawl singularly engaging said surfaces to retain the segment in said selected positions;
   a pushing pawl having a direction of travel effective to engage said surfaces;
   biasing means providing a force for urging said segment to move in a direction generally opposite that of said pushing pawl;
   means having a movement effective for moving said pushing pawl into engagement with one of said surfaces to sequentially effect the incremental movement of said control segment to index the same to one of various selected positions whereat the holding pawl engages said one surface and retains the segment against the force of said biasing means; and
   said movement means including means for releasing said pushing and holding pawls from engagement with said segment, said releasing means operatively engaging said pawls during continued movement of moving means after indexing occurs wherein the segment is released for movement back to former positions;
   said segment comprises a sector mounted on said control shaft to rotatably drive the same, the peripheral portion of said sector defining an arcuate rack on which said radial surfaces are disposed; and
   said holding pawl member has an elongated shape and is pivotally mounted intermediate its ends on said frame, and spring means biasing one end of said holding pawl into engagement with said arcuate rack; said movement means comprising:
   a shaft mounted to said frame and having its principal axis disposed transversely to the rack of said sector;
   a pushing pawl assembly comprising a tubular body rotatably mounted on said shaft, an arm secured to said body and disposed in radial extension therefrom, said arm pivotally carrying said pushing pawl thereon;
   actuating means connected to said pushing pawl assembly and operative to rotate the same about the principal axis of said shaft to thereby swing the pushing pawl in an arcuated path for moving the pushing pawl into engagement with said surfaces and indexing said segment.

5. The invention as recited in claim 4 wherein said actuating means comprises an operating lever rotatably mounted intermediate its ends on said shaft, a resilient strut interconnecting said lever and said arm of the pushing pawl assembly wherein a rotation movement of said lever imparts a corresponding movement of said assembly and said pushing pawl.

6. The invention as recited in claim 5 wherein said pushing pawl assembly includes a stop arm affixedly mounted in radial extension from said body, a stop mounted on said frame for preventing further rotation of said assembly upon the pushing pawl rotating said segment to the position where the holding pawl engages said one surface, and said release means comprising a pin mounted on said lever and disposed to engage each said pawl and disengage the same from said segment upon further rotating of said lever after the pushing pawl assembly has been prevented from further rotation.

7. A control mechanism comprising:
   a frame;
   an output shaft journaled on said frame;
   a control segment mounted on said shaft for rotatively advancing the same in a sequence of incremental angular displacements, said control segment including a rack portion having a series of steps arranged to define a plurality of radial surfaces angularly displaced in a continuous arcuate relation to said shaft wherein said surfaces correlate to the angular displacements of the shaft;
   a holding pawl pivotally mounted on said frame and disposed for selective engagement with said surface;
   a movable pushing pawl disposed for selective engagement with said surfaces;
   means for biasing said segment in opposition to the advancement thereof;
   support means for mounting and moving the pushing pawl relative to said segment into pushing relation to the segment through engagement with one of said surfaces, and to drive the pushing pawl and effect an advance of the segment wherein the holding pawl engages said one surface to retain the segment thereat; and means for actuating said support means to selectively effect the movements thereof, said actuating means including kick out means operative to disengage both of said pawls from said segment during advancement thereof from a predetermined range of positions to incrementally advance the control segment to a position beyond said range to release both pawls and accommodate direct return of the segment to an initial portion.

8. A control mechanism comprising:

a frame;

an output shaft journaled on said frame;

a control segment mounted on said shaft for rotatively advancing the same in a sequence of incremental angular displacements, said control segment including a rack portion having a series of steps arranged to define a plurality of radial surfaces angularly displaced in a continuous arcuate relation to said shaft wherein said surfaces correlate to the angular displacements of the shaft;

a holding pawl pivotally mounted on said frame and disposed for selective engagement with said surface;

a movable pushing pawl disposed for selective engagement with said surfaces;

means for biasing said segment in opposition to the advancement thereof;

support means for mounting and moving the pushing pawl relative to said segment in one direction into pushing relation to the segment through engagement with one of said surfaces, and in another direction to drive the pushing pawl and effect an advance of the segment wherein the holding pawl engages said one surface to retain the segment thereat; and means for actuating said support means to selectively effect the movements thereof, said activating means including means operative to disengage both of said pawls from said segment during advancement thereof from one position to another; said support means comprises:

a shaft mounted on said frame transversely to said radial surfaces of said segment;

a support assembly comprising a tubular body rotatably mounted on said shaft, an arm affixedly secured to said body in radial extension therefrom, a member secured to said arm and pivotally carrying said pushing pawl in alignment with said surfaces for engagement therewith;

said assembly rotatably movable on said shaft producing an arcuate path of said arm defining the aforementioned directions of movement of said pushing pawl.

9. The invention as recited in claim 8 wherein said actuating means comprises:

an operating arm rotatably mounted intermediate its ends on said shaft;

spring means interconnecting said operating arm and said arm of said assembly effecting a resilient connection therebetween such that a rotational movement of said operating arm produces a corresponding rotational movement in said assembly and said arcuate movement of said pushing pawl in said driving direction; and a stop acting to retain said support assembly to prevent further rotation thereof upon engagement of said holding pawl in retaining relation with said one surface.

10. The invention as recited in claim 9 wherein said means for disengaging said pawls comprises an element connected to said operating arm and disposed transversely to said pawls, said element having a direction of travel corresponding to continual rotational movement of said operating arm after retention of said support assembly wherein said element engages and pivots said pawls from engagement with said surfaces of said segment.

11. The invention as recited in claim 10 wherein said segment and operating arm include means coacting to correlate the travel of said pushing pawl when moving in said one direction into pushing relation to the segment to effect a limit of said travel to a particular quantity of the angular displacement of said surfaces on the segment.

* * * * *